US008973505B2

United States Patent
Hurd

(10) Patent No.: US 8,973,505 B2
(45) Date of Patent: Mar. 10, 2015

(54) MOTORIZED DOLLY

(71) Applicant: Redrock Microsystems LLC, Flower Mound, TX (US)

(72) Inventor: James D. Hurd, Flower Mound, TX (US)

(73) Assignee: Redrock Microsytems, LLC, Flower Mound, TX (US)

( * ) Notice: Subject to any disclaimer, the term of this patent is extended or adjusted under 35 U.S.C. 154(b) by 0 days.

(21) Appl. No.: 14/026,954

(22) Filed: Sep. 13, 2013

(65) Prior Publication Data

US 2014/0076192 A1 Mar. 20, 2014

Related U.S. Application Data

(60) Provisional application No. 61/701,162, filed on Sep. 14, 2012.

(51) Int. Cl.
*B61B 9/00* (2006.01)
*B61B 13/00* (2006.01)
*F16M 11/18* (2006.01)
*F16M 11/42* (2006.01)

(52) U.S. Cl.
CPC . *B61B 9/00* (2013.01); *B61B 13/00* (2013.01); *F16M 11/18* (2013.01); *F16M 11/425* (2013.01); *Y02T 30/40* (2013.01)
USPC .......................................... 104/165; 396/428

(58) Field of Classification Search
USPC ................... 104/165, 247, 245, 307
See application file for complete search history.

(56) References Cited

U.S. PATENT DOCUMENTS

| | | | | |
|---|---|---|---|---|
| 3,598,355 | A | * | 8/1971 | English .......................... 396/428 |
| 3,613,546 | A | * | 10/1971 | Richardson .................... 396/428 |
| 4,516,171 | A | | 5/1985 | Yamazaki |
| 4,699,484 | A | * | 10/1987 | Howell et al. .................. 352/243 |
| 5,059,019 | A | * | 10/1991 | McCullough .................. 352/131 |
| 5,225,863 | A | * | 7/1993 | Weir-Jones ..................... 396/56 |
| 5,609,108 | A | * | 3/1997 | Chapman ...................... 105/170 |
| 5,711,227 | A | * | 1/1998 | Johnson ........................ 104/126 |
| 7,637,215 | B2 | * | 12/2009 | Fisher ........................... 105/159 |
| 7,637,216 | B2 | * | 12/2009 | Fisher ........................... 105/159 |
| 7,752,978 | B2 | * | 7/2010 | Schroeder ..................... 104/245 |
| 7,891,888 | B2 | * | 2/2011 | Wood ............................ 396/428 |
| 8,142,019 | B2 | * | 3/2012 | Hernandez .................... 352/243 |
| 8,684,605 | B2 | * | 4/2014 | Schroeder ....................... 384/55 |
| 8,721,199 | B1 | * | 5/2014 | Hart .............................. 396/428 |
| 2005/0007553 | A1 | * | 1/2005 | Romanoff et al. ............ 352/243 |
| 2005/0231689 | A1 | * | 10/2005 | Longley ........................ 352/243 |
| 2006/0170808 | A1 | | 8/2006 | Biernath et al. |

(Continued)

*Primary Examiner* — Jason C Smith
(74) *Attorney, Agent, or Firm* — Daniel J. Chalker; Chalker Flores, LLP

(57) ABSTRACT

A motorized dolly includes an elongated frame, a first and second arc-shaped rail, a first and second pulley, a continuous belt, a motor, a platform, a first and second set of rollers or wheels, a fastener and one or more controls. The first arc-shaped rail has a first radius to a point in space. The second arc-shaped rail has a second radius greater than the first radius. The first and second pulleys are attached to the elongated frame proximate to each end. The continuous belt is movably attached to the first pulley and the second pulley. The motor is operably engaged with the first pulley, the second pulley or the continuous belt. The first and second set of rollers or wheels are attached to the platform and movably engaged with the first and second rails, respectively. The fastener securely is attached to the platform and the continuous belt.

36 Claims, 7 Drawing Sheets

(56) References Cited

U.S. PATENT DOCUMENTS

| | | | |
|---|---|---|---|
| 2007/0095246 A1* | 5/2007 | Heiligenmann | 104/307 |
| 2007/0251408 A1* | 11/2007 | Fletcher et al. | 104/247 |
| 2008/0315543 A1* | 12/2008 | Fisher | 280/86 |
| 2009/0212194 A1* | 8/2009 | Wood | 248/647 |
| 2009/0309986 A1* | 12/2009 | Mayer | 348/208.99 |
| 2014/0076192 A1* | 3/2014 | Hurd | 104/165 |
| 2014/0299013 A1* | 10/2014 | Hall | 104/307 |

* cited by examiner

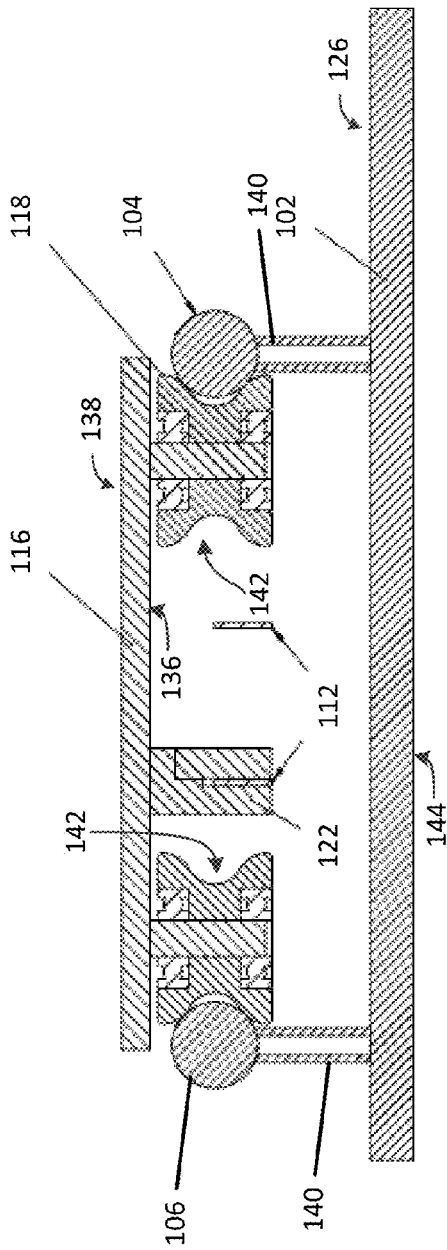
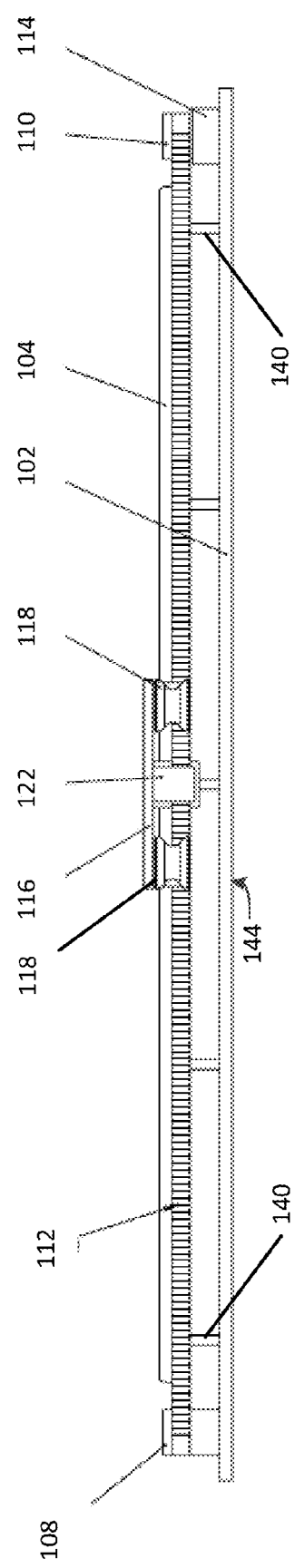

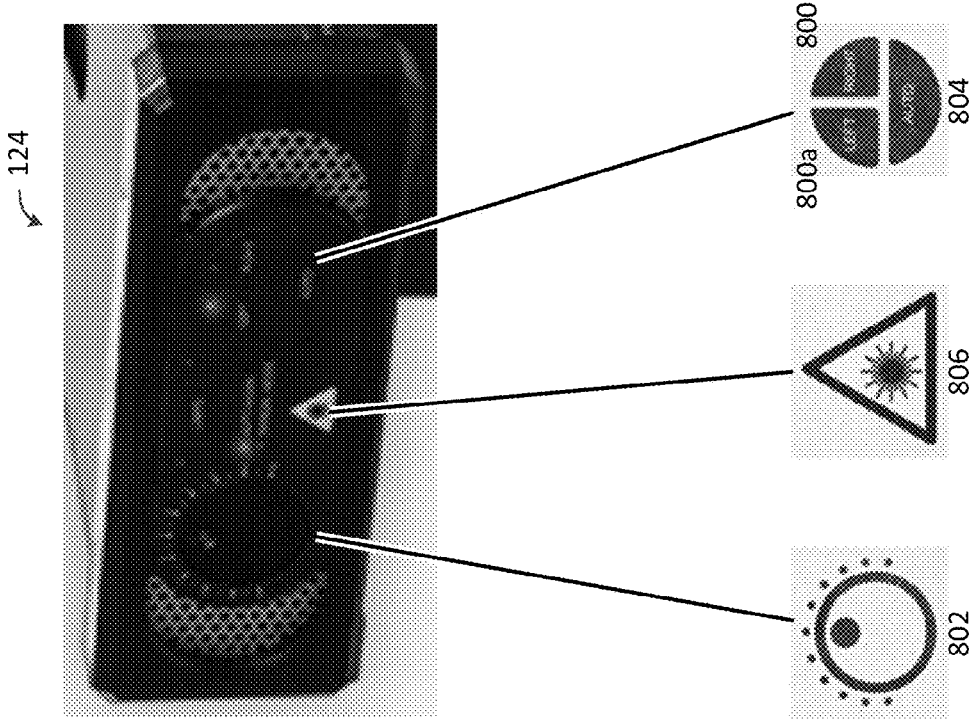
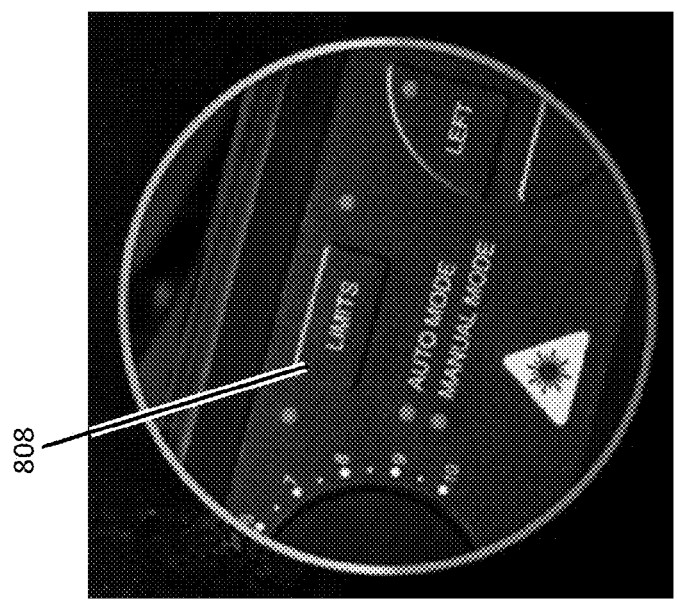
FIG. 8A
FIG. 8B

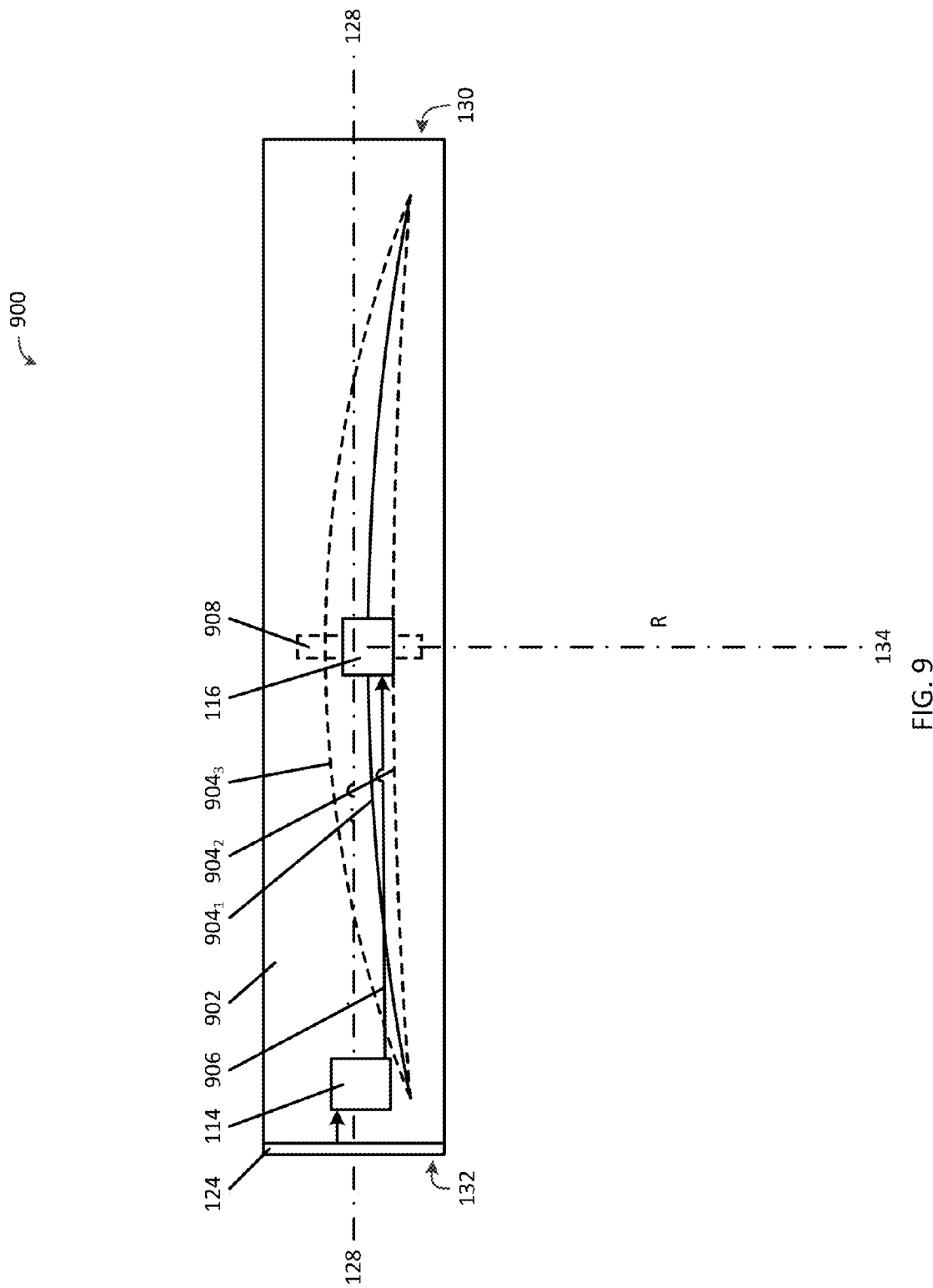

MOTORIZED DOLLY

CROSS-REFERENCE TO RELATED APPLICATIONS

This non-provisional Patent Application claims priority to U.S. Provisional Patent Application Ser. No. 61/701,162, filed Sep. 14, 2012, entitled "Automated Camera Dolly," the contents of which is incorporated by reference herein in its entirety.

INCORPORATION-BY-REFERENCE OF MATERIALS FILED ON COMPACT DISC

None.

TECHNICAL FIELD OF THE INVENTION

The present invention relates in general to the track and dolly systems for moving a device.

STATEMENT OF FEDERALLY FUNDED RESEARCH

None.

BACKGROUND OF THE INVENTION

Without limiting the scope of the invention, its background is described in connection with camera dollies. Existing camera dollies, except for custom dollies used in the motion picture industry, use straight tracks. This requires a person to move the camera and another person to focus the camera.

SUMMARY OF THE INVENTION

The present invention allows a device, such as a camera, to be operated on a dolly without any operator controlling pan/tilt/focus. As a camera moves on a curved track, the curved track keeps the camera on the subject at a specific distance. This eliminates the need for extra people to handle panning, tilting, and focusing. As a result, a single person can conduct a camera shot by them without any assistance. Moreover, the device dolly is self-contained and easily transportable.

The present invention provides a motorized dolly that includes an elongated base, a first and second arc-shaped rail, a first and second pulley, a continuous belt, a motor, a platform, a first and second set of rollers or wheels, a fastener and one or more controls. The elongated base has a top surface and a longitudinal axis extending between a first end and a second end. The first arc-shaped rail is attached to the top surface of the elongated base and has a first radius to a point in space substantially perpendicular to the longitudinal axis. The second arc-shaped rail is attached to the top surface of the elongated base and has a second radius greater than the first radius. The first pulley is attached to the top surface of the elongated base proximate to the first end. The second pulley is attached to the top surface of the elongated base proximate to the second end. The continuous belt is movably attached to the first pulley and the second pulley. The motor is operably engaged with the first pulley, the second pulley or the continuous belt. The platform has a bottom surface and a top surface. The first set of rollers or wheels are attached to the bottom surface of the platform and are movably engaged with the first rail. The second set of rollers or wheels are attached to the bottom surface of the platform and are movably engaged with the second rail. The fastener is securely attached to the bottom surface of the platform and the continuous belt. The one or more controls are electrically connected to the motor.

In addition, the present invention provides a motorized dolly that includes an elongated frame, a first and second arc-shaped rail, a first and second pulley, a continuous belt, a motor, a platform, a first and second set of rollers or wheels, a fastener and one or more controls. The elongated frame has a longitudinal axis extending between a first end and a second end. The first arc-shaped rail is attached to the elongated frame and has a first radius to a point in space substantially perpendicular to the longitudinal axis. The second arc-shaped rail is attached to the elongated frame and has a second radius greater than the first radius. The first pulley is attached to the elongated frame proximate to the first end. The second pulley is attached to the elongated frame proximate to the second end. The continuous belt is movably attached to the first pulley and the second pulley. The motor is operably engaged with the first pulley, the second pulley or the continuous belt. The first set of rollers or wheels is attached to the platform and movably engaged with the first rail. The second set of rollers or wheels is attached to the platform and movably engaged with the second rail. The fastener securely is attached to the platform and the continuous belt. The one or more controls are electrically connected to the motor.

Moreover, the present invention provides a motorized dolly that includes an elongated frame having a longitudinal axis extending between a first end and a second end, one or more arc-shaped rails attached to the elongated frame and having a radius to a point in space substantially perpendicular to the longitudinal axis, a platform movably connected to the one or more arc-shaped rails, means for moving the platform along the one or more arc-shaped rails, a motor operably engaged with the moving means, and one or more controls electrically connected to the motor.

BRIEF DESCRIPTION OF THE DRAWINGS

For a more complete understanding of the features and advantages of the present invention, reference is now made to the detailed description of the invention along with the accompanying figures and in which:

FIG. 2 is a side cross-sectional view of the motorized dolly of FIG. 1;

FIG. 3 is a rear cross-sectional view of the motorized dolly of FIG. 1;

FIGS. 8A-8B are photographs of one or more controls for a motorized dolly in accordance with one embodiment of the present invention;

FIG. 9 is a block diagram of a motorized dolly in accordance with one embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention provides a self-contained motorized dolly with curved track for a device, such as a camera. As the camera moves on the track, the curved track keeps the camera on the subject at a specific distance to a point in space. This eliminates the need for extra people to handle panning, tilting, and focusing. An operator can turn on the device, set the speed, and the camera will dolly left and right until the device turns off. The camera will stay focus on the subject the entire time.

Figure 1:
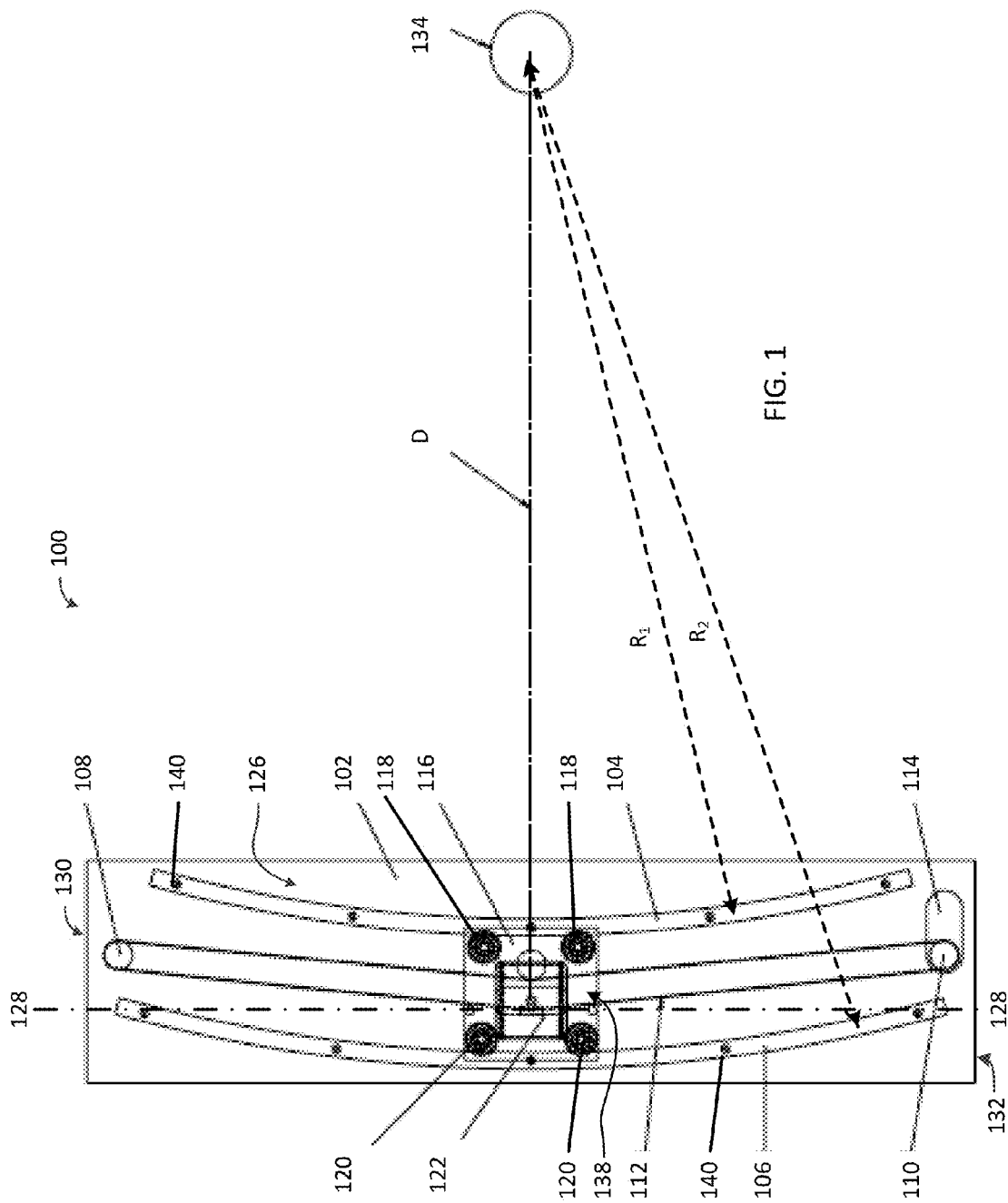
FIG. 1 is an exposed top view of a motorized dolly in accordance with one embodiment of the present invention.
Figure 6:
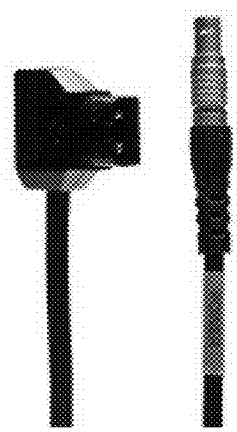
FIG. 6 is a photograph of a battery adapter for use with a motorized dolly in accordance with one embodiment of the present invention.

Now referring to FIGS. 1-3, various views of a motorized dolly 100 in accordance with one embodiment of the present invention is shown. The motorized dolly 100 includes an elongated base 102, a first arc-shaped rail 104, a second arc-shaped rail 106, a first pulley 108, a second pulley 110, a continuous belt 112, a motor 114, a platform 116, a first set of rollers or wheels 118, a second set of rollers or wheels 120, a fastener 122 and one or more controls 124 (not shown). The elongated base 102 has a top surface 126 and a longitudinal axis 128 extending between a first end 130 and a second end 132. The first arc-shaped rail 104 is attached to the top surface 126 of the elongated base 102 and has a first radius $R_1$ to a point in space or subject 134 substantially perpendicular to the longitudinal axis 128. A specified distance from the center of the platform 116 to the point is space or subject 134 is D. The second arc-shaped rail 106 is attached to the top surface 126 of the elongated base 102 and has a second radius $R_2$ greater than the first radius $R_1$. The first pulley 108 is attached to the top surface 126 of the elongated base 102 proximate to the first end 130. The second pulley 110 is attached to the top surface 126 of the elongated base 102 proximate to the second end 132. The continuous belt 112 is movably attached to the first pulley 108 and the second pulley 110. The motor 132 (e.g., a variable speed motor or drive unit, etc.) is operably engaged with the first pulley 108, the second pulley 110 (as shown) or the continuous belt 112. The platform 116 has a bottom surface 136 and a top surface 138. The first set of rollers or wheels 118 are attached to the bottom surface 136 of the platform 116 and are movably engaged with the first rail 104. The second set of rollers or wheels 120 are attached to the bottom surface 136 of the platform 116 and are movably engaged with the second rail 106. The fastener 122 is securely attached to the bottom surface 136 of the platform 116 and the continuous belt 112. The one or more controls 124 (not shown) are electrically connected to the motor 132 and will be discussed below in reference to FIGS. 8A-8B. A power source (not shown) is connected to the motor 132. The power source can be an AC-to-DC adapter, one or more batteries, one or more photovoltaic cells or a combination thereof. For example, FIG. 6 is a photograph of a battery adapter (D-Tap cable) for use with a D-Tap battery source. Other types of power sources and adapters can be used.

Figure 4:
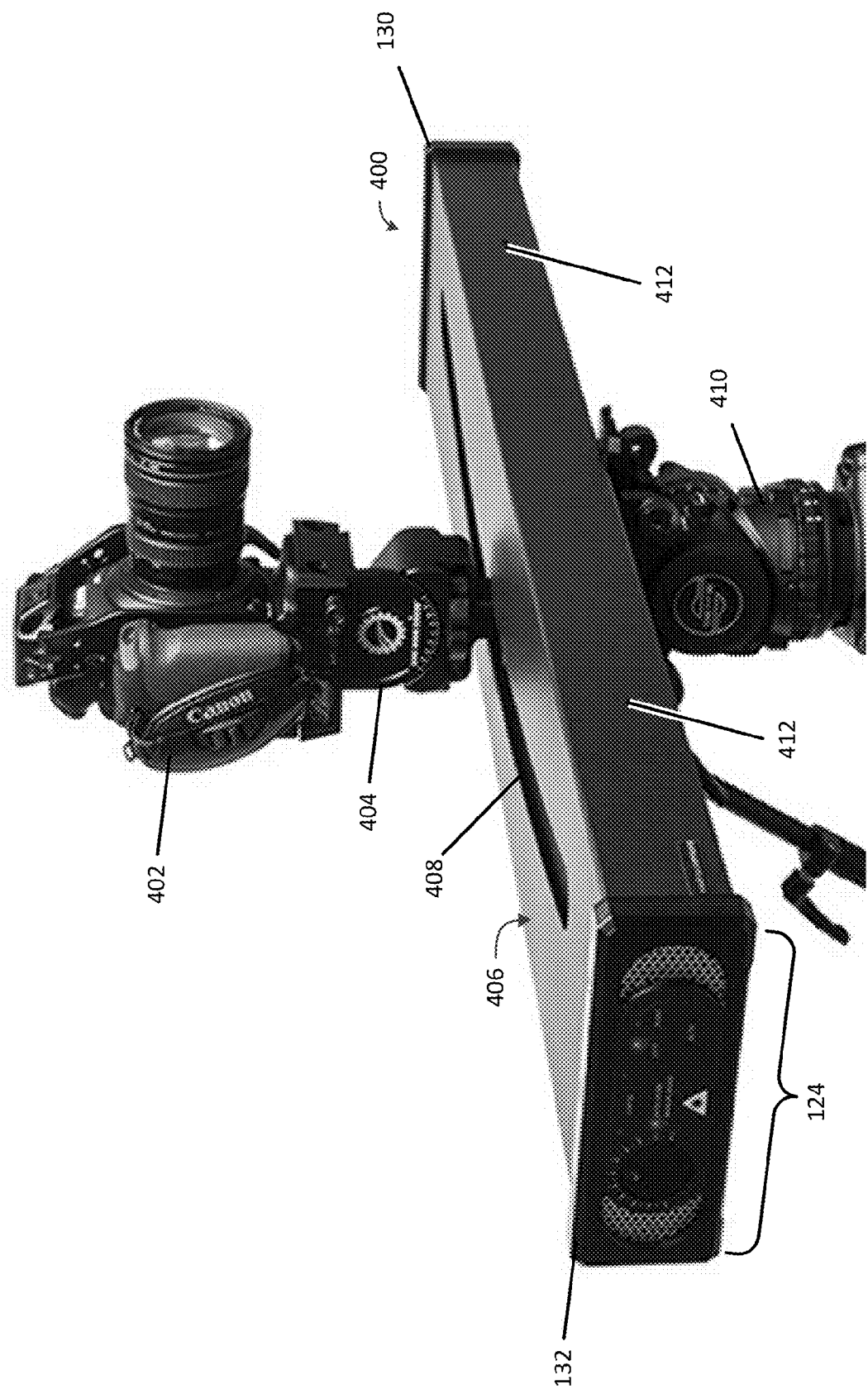
FIGS. 4-5 are photographs of a motorized dolly in accordance with one embodiment of the present invention.
Figure 5:

Briefly referring to FIGS. 4-5, a device 402, such as a camera, light source, scientific instrument or other desirable object or device can be attached to, mounted on or otherwise placed on the top surface 136 of the platform 116 using one or more connectors 404, such as a tilt head as shown. Other types of connectors or fasteners can be used to removably and securely attach the device 402 to the top surface 136 of the platform 116. One or more level indicators (not shown) can be attached to or integrated into the tilt head, elongated base 102 or elongated frame 406. In addition, a housing, enclosure or frame 406 can be attached to the elongated base 102 and at least partially enclosing the first and second arc-shaped rails 104 and 106, the first and second pulleys 108 and 110, the continuous belt 112, the motor 114, the first and second set of rollers or wheels 116 and 118, and the clamp 122. The platform 116 can be disposed within the housing 406 and at least a portion of the top surface 138 of the platform 116 is accessible from outside of the housing 406, or the platform 116 is disposed outside of the housing 406.

Referring back to FIGS. 1-3, the first and second arc-shaped rails 104 and 106 can be attached to the top surface 126 of the elongated base 102 via supports 140 (as shown), direct attachment or suitable methods. Each arc-shaped rail 104 or 106 can have a circular (as shown), oval, elliptical, triangular, square, polygon, I or L-shaped cross-section. Each set of rollers or wheels 118 or 120 may include two, three, four or more rollers or wheels. Each roller or wheel has a groove 142 adapted to fit the first or second arc-shaped rails 104 and 106. The term roller or wheel can also mean a gear, cogwheel, sprocket or other device to cause the platform 116 to move along the arc-shaped rails 104 and 106. The continuous belt 112 can be ribbed belt, a toothed belt, a V-belt, a multi-grooved belt, a cable, a chain or other suitable movement mechanism. The fastener 122 can be a clamp, a bolt, a clip, a pin, a rivet, a snap, a staple or a combination thereof. Other types of permanent or removable fasteners can be used. A set of legs or rubberized feet (not shown) can be attached to a bottom surface 144 of the elongated base 102. In addition, a fitting, such as connector or adapter, (not shown) can be attached to or integrated into the bottom surface 144 of the elongated base 102 to secure the motorized dolly 100 to a tripod or stand. In another embodiment, the first and second arc-shaped rails 104 and 106 can be adjustable such that the specified distance D from the center of the platform 116 to the point is space or subject 134 can be changed.

Referring now to FIGS. 4-5, photographs of a motorized dolly 400 in accordance with one embodiment of the present invention are shown. The motorized dolly 400 includes an elongated frame (open or enclosed such as 406), a first and second arc-shaped rail (not shown), a first and second pulley (not shown), a continuous belt (not shown), a motor (not shown), a platform (not shown), a first and second set of rollers or wheels (not shown), a fastener (not shown) and one or more controls 124. The elongated frame 406 has a longitudinal axis (not shown) extending between a first end 130 and a second end 132. The first arc-shaped rail is attached to the elongated frame 402 and has a first radius to a point in space substantially perpendicular to the longitudinal axis. The second arc-shaped rail is attached to the elongated frame 402 and has a second radius greater than the first radius. The first pulley is attached to the elongated frame 402 proximate to the first end 130. The second pulley is attached to the elongated frame 402 proximate to the second end 132. The continuous belt is moveably attached to the first pulley and the second pulley. The motor is operably engaged with the first pulley, the second pulley or the continuous belt. The first set of rollers or wheels is attached to the platform and moveably engaged with the first rail. The second set of rollers or wheels is attached to the platform and moveably engaged with the second rail. The fastener securely is attached to the platform and the continuous belt. The one or more controls 124 are electrically connected to the motor. The first and second arc-shaped rails, the first and second pulleys and the motor can be attached to a bottom portion of the elongated frame 402, a top portion of the elongated frame 402, a side portion of the elongated frame 402 or a combination thereof.

As shown, the elongated frame 406 completely encloses the first and second arc-shaped rails, the first and second pulleys, the continuous belt, the motor, the first and second set of rollers or wheels and the fastener. Elongated opening 408 allows the device 402 to be connected to the platform. Alternatively, the elongated frame 402 can at least partially enclose one or more of the components. As shown, the platform is disposed within the elongated frame 406 and at least a portion of the platform is accessible from outside of the elongated frame 406. Alternatively, all or port of the platform can be disposed outside of the elongated frame 406. A set of legs or rubberized feet (not shown) can be attached to a bottom surface of the elongated frame 406. In addition, a fitting, such as connector or adapter, (not shown) (e.g., an integrated ¼"-20 and ⅜"-16 cheese plate) can be attached to or integrated into the bottom surface of the elongated frame 406 to secure the motorized dolly 400 to a tripod or stand 410. One or more handles (not shown) can be attached to the elongated frame 406.

Figure 7:
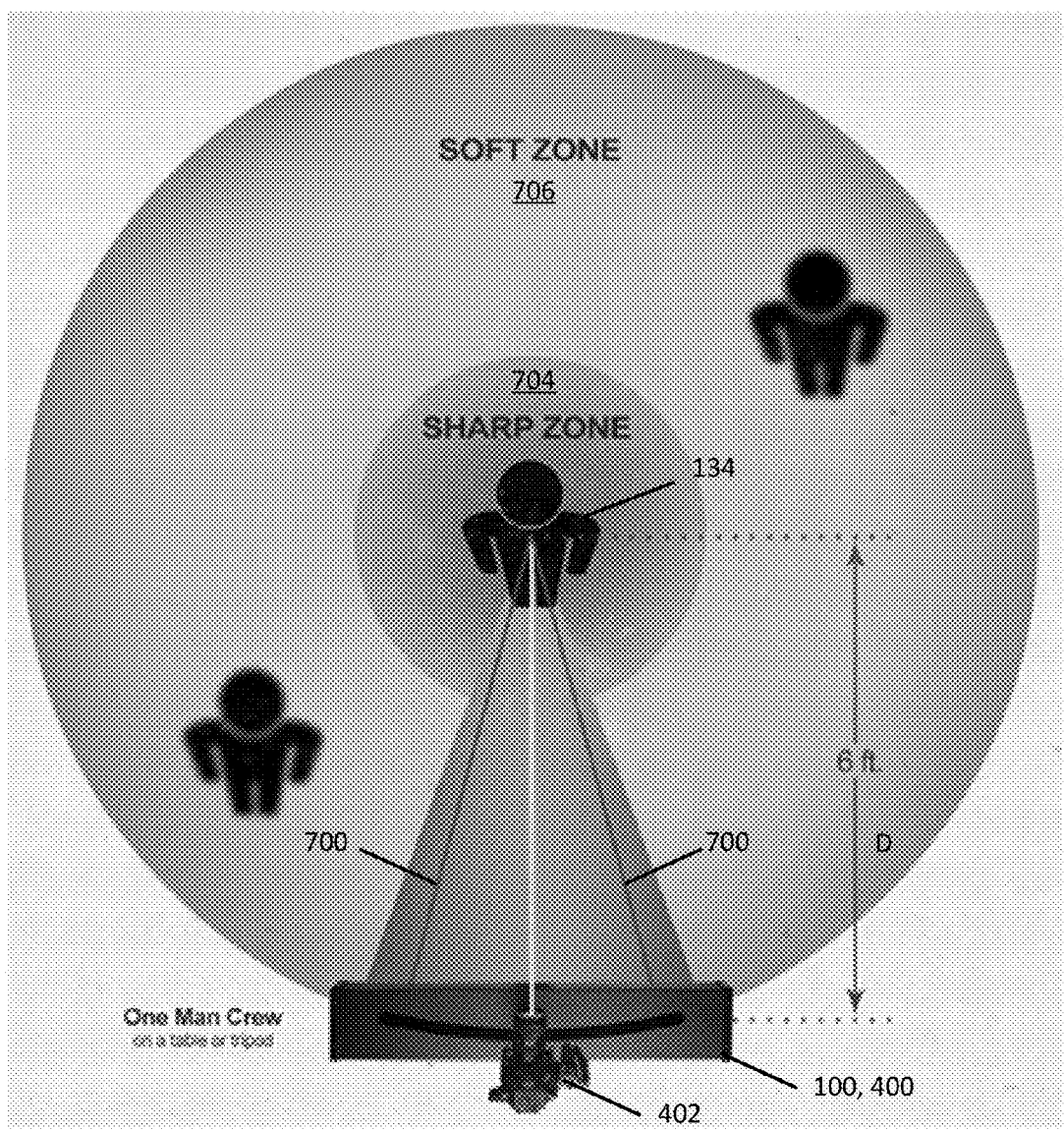
FIG. 7 is diagram demonstrating a placement and use of a motorized dolly in accordance with one embodiment of the present invention.

The one or more controls 124 are located at the second end 132, but can be located anywhere on the motorized dolly 400. The one or more controls 124 smoothly transition the motor from a clockwise rotation to a counter-clockwise rotation and vise versa. The one or more controls 124 will be described in more detail in reference to FIGS. 8A-8B. As illustrated in FIG. 7, the motorized dolly 400 includes one or more lasers attached to the elongated frame 406 and aligned to project two or more laser beams through openings or ports 412 that are spaced apart from one another and converge approximately at the point in space or subject 134.

The embodiment shown in FIGS. 4-5 is extremely portable. Weighing in at approximately 14 pounds with the body dimensions of approximately 46"×9"×4", and the added convenience of a durable canvas carrying case, the motorized dolly can be taken anywhere a person needs to go. The motorized dolly is ideal for corporate, documentary, interviews, and product/tabletop photography where smooth, controlled, and repeatable motion creates that extra sparkle in your product shots. The motorized dolly can be used on the main camera when alone for a high-end production feel, or use with a second camera for cutting between shots with beautiful high quality movement. Moreover, more than one motorized dolly can be used in multi-camera shoots for getting those extra shots that make the difference.

The motorized dolly can be unpacked, setup, and ready to shoot in under two minutes by a single person thanks to a lightweight self-contained design, intuitive laser alignment guides, and push button ease of use. The motorized dolly does the rest, delivering smooth, controlled camera motion for that high-end production feel. Once set up, the subject stays in focus and stationary in the frame without any operator assistance. Push-button ease of use means you are getting the shot, not fiddling with controls and programming while everyone is waiting. The motor, platform and track system are nearly silent so that the motorized dolly is quiet enough to be used with audio.

More specifically, the technical specifications for one embodiment of the present invention are:
Track length: 36"
Set custom end points: yes
Speed control: real-time wheel controlled
Leveling assist: bubble level
Automatic track: yes
Manual track: yes
Maximum camera weight limit: 20+ lbs
Support options: centered bottom plate with tripod mount holes (¼" and ⅜"), rubberized corner feet for tabletop or ground
Accessory mounts: integrated ⅜" and ¼" female mounting points on rear
Camera head: heavy load tilt head
Alignment setup: laser assisted with on/off toggle
Carrying handle: integrated soft handle
Power: AC (universal adapter included) or D-tap battery (with optional cable)
Dimensions: 9"×3.25"×46"
Weight: 14.5 lbs including tilt head Now referring to FIG. 7, a diagram demonstrating a placement and use of a motorized dolly 100 or 400 in accordance with one embodiment of the present invention is shown. The motorized dolly 100 or 400 is designed to keep a subject 134 both in focus and stationary in the frame while providing cinematic movement to foreground and background objects. This results in added production value to any interview or product shoot, without the need for an additional operator. The motorized dolly 100 or 400 uses a set of high-powered lasers that are visible in all environments. Once turned on, the lasers will converge on a subject at precisely six feet away (D) as illustrated by lines 700. The greater the distance the subject 134 is from the suggested six feet, which is indicated by the sharp zone 704, the greater amount the subject will move across the frame through the motion, which is indicated by the soft zone 706. Focus will also be affected by the available depth of field. The motorized dolly 100 or 400 can be designed or adjusted to have a D other than six feet (e.g., four feet, ten feet, twenty-five feet, fifty feet, etc).

Referring now to FIGS. 8A-8B, photographs of one or more controls for a motorized dolly 100 or 400 in accordance with one embodiment of the present invention are shown. 17. The one or more controls 124 smoothly transition the variable speed motor from a clockwise rotation to a counter-clockwise rotation and vise versa. In other words, the motor is ramped down and up making every second of the footage captured from the motorized dolly 100 or 400 usable in the final product. The one or more controls 124 may include a directional control (left=800a, right 800b) connected to the motor, a speed control 802 connected to the motor, or a multi-mode switch 804 having an automatic operating mode and a manual operating mode. The speed control 802 shown as a variable speed wheel can the platform travel speed on the fly while the system is running. The one or more controls 124 may also include an on/off switch 806 for the laser(s), various indicator lights, a button 808 to select travel limits to choose a smaller portion of the track as desired, and any other desirable controls. A communications interface (not shown) can be connected to the one or more controls 124 to provide remote (wired and/or wireless) control and/or monitoring of the motorized dolly 100 or 400. A monitor can also be attached to the elongated base and communicably coupled to the camera so that the operator can easily see what is being recorded by the camera.

The one or more controls 124 are simple and intuitive, so a person can begin working with the motorized dolly right out of the box. It features a clearly marked variable speed dial, direction controls, and automatic functionality. It also features laser guides to accurately set distance to subject. Moreover, the one or more controls know when to ease the motor in and out when it changes direction so footage is not lost to bumps and shakes. The motorized dolly's heavy-duty tilt head includes precision markings and a bullseye level for precise, repeatable shots. It will mount to any camera or baseplate. The body will mount to any tripod. In addition, the motorized dolly can be tapped ready for the addition of an external monitor. Ideally, the external monitor is stationary as opposed to attached to the moving camera itself. This provides a better reference of the final product for the shooter.

Now referring to FIG. 9, a block diagram of a motorized dolly 900 in accordance with one embodiment of the present invention is shown. The motorized dolly 900 includes an elongated frame 902 having a longitudinal axis 128 extending between a first end 130 and a second end 132, one or more arc-shaped rails 904 attached to the elongated frame and having a radius R to a point in space 134 substantially perpendicular to the longitudinal axis 128, a platform 1186 moveably connected to the one or more arc-shaped rails 904, means 906 for moving the platform along the one or more arc-shaped rails 904, a motor 114 operably engaged with the moving means 906, and one or more controls 124 electrically connected to the motor 114. The one or more arc-shaped rails 904 can be adjustable using one or more suitable manual, mechanical or electrical mechanisms to vary the radius R as shown by positions $904_1$, $904_2$ and $904_3$.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A motorized dolly comprising:
   an elongated base having a top surface and a longitudinal axis extending between a first end and a second end;
   a first arc-shaped rail attached to the top surface of the elongated base and having a first radius to a point in space substantially perpendicular to the longitudinal axis;
   a second arc-shaped rail attached to the top surface of the elongated base and having a second radius greater than the first radius;
   a first pulley attached to the top surface of the elongated base proximate to the first end;
   a second pulley attached to the top surface of the elongated base proximate to the second end;
   a continuous belt moveably attached to the first pulley and the second pulley;
   a motor operably engaged with the first pulley, the second pulley or the continuous belt;
   a platform having a bottom surface and a top surface;
   a first set of rollers or wheels attached to the bottom surface of the platform and moveably engaged with the first rail;
   a second set of rollers or wheels attached to the bottom surface of the platform and moveably engaged with the second rail;
   a fastener securely attached to the bottom surface of the platform and the continuous belt; and
   one or more controls electrically connected to the motor.

2. The motorized dolly as recited in claim 1, further comprising a housing attached to the elongated base and at least partially enclosing the first and second arc-shaped rails, the first and second pulleys, the continuous belt, the motor, the first and second set of rollers or wheels and the clamp.

3. The motorized dolly as recited in claim 2, wherein the platform is disposed within the housing and at least a portion of the top surface of the platform is accessible from outside of the housing, or the platform is disposed outside of the housing.

4. The motorized dolly as recited in claim 1, wherein:
   the fastener comprises a clamp, a bolt, a clip, a pin, a rivet, a snap, a staple or a combination thereof;

the continuous belt comprises a ribbed belt, a toothed belt, a V-belt, a multi-grooved belt, a cable or a chain;

each rail has a circular, oval, elliptical, triangular, square, polygon, I or L-shaped cross-section;

each set of rollers or wheels comprise two, three or four rollers or wheels; and each roller or wheel has a groove adapted to fit the first or second arc-shaped rails.

5. The motorized dolly as recited in claim 1, further comprising a tilt head connected to the top surface of the platform and having one or more connectors to removeably and securely attach a device to the tilt head.

6. The motorized dolly as recited in claim 5, further comprising a level indicator integrated into the tilt head.

7. The motorized dolly as recited in claim 5, wherein the device comprises a camera, a light source, or a scientific instrument.

8. The motorized dolly as recited in claim 1, further comprising one or more connectors attached to the platform to removeably and securely attach a device to the top surface of the platform.

9. The motorized dolly as recited in claim 1, further comprising a camera attached to the top surface of the platform, and a monitor attached to the elongated base and communicably coupled to the camera.

10. The motorized dolly as recited in claim 1, further comprising a communications interface connected to the one or more controls.

11. The motorized dolly as recited in claim 1, wherein the one or more controls comprise:
    a directional control connected to the motor;
    a speed control connected to the motor; or
    a multi-mode switch having an automatic operating mode and a manual operating mode.

12. The motorized dolly as recited in claim 1, further comprising one or more lasers attached to the elongated base and aligned to project two or more laser beams that are spaced apart from one another at the elongated base and converge approximately at the point in space.

13. The motorized dolly as recited in claim 1, further comprising a set of legs or rubberized feet attached to a bottom surface of the elongated base.

14. The motorized dolly as recited in claim 1, further comprising a fitting attached to a bottom surface of the elongated base to secure the motorized dolly to a tripod or stand.

15. The motorized dolly as recited in claim 1, further comprising a level indicator attached to or integrated into the elongated base or the platform.

16. The motorized dolly as recited in claim 1, wherein the motor comprises a variable speed motor.

17. The motorized dolly as recited in claim 16, wherein the one or more controls smoothly transition the variable speed motor from a clockwise rotation to a counter-clockwise rotation and vise versa.

18. The motorized dolly as recited in claim 1, further comprising a handle attached to the elongated base.

19. The motorized dolly as recited in claim 1, further comprising a power source connected to the motor.

20. The motorized dolly as recited in claim 19, wherein the power source comprises an AC-to-DC adapter, one or more batteries, one or more photovoltaic cells or a combination thereof.

21. The motorized dolly as recited in claim 1, wherein the first radius of the first arc-shaped rail and the second radius of the second arc-shaped rail are adjustable.

22. A motorized dolly comprising:
    an elongated frame having a longitudinal axis extending between a first end and a second end;
    a first arc-shaped rail attached to the elongated frame and having a first radius to a point in space substantially perpendicular to the longitudinal axis;
    a second arc-shaped rail attached to the elongated frame and having a second radius greater than the first radius;
    a first pulley attached to the elongated frame proximate to the first end;
    a second pulley attached to the elongated frame proximate to the second end;
    a continuous belt moveably attached to the first pulley and the second pulley;
    a motor operably engaged with the first pulley, the second pulley or the continuous belt;
    a platform;
    a first set of rollers or wheels attached to the platform and moveably engaged with the first rail;
    a second set of rollers or wheels attached to the platform and moveably engaged with the second rail;
    a fastener securely attached to the platform and the continuous belt; and
    one or more controls electrically connected to the motor.

23. The motorized dolly as recited in claim 22, wherein the first and second arc-shaped rails, the first and second pulleys and the motor are attached to a bottom portion of the elongated frame, a top portion of the elongated frame, a side portion of the elongated frame or a combination thereof.

24. The motorized dolly as recited in claim 22, wherein the elongated frame at least partially encloses the first and second arc-shaped rails, the first and second pulleys, the continuous belt, the motor, the first and second set of rollers or wheels and the fastener.

25. The motorized dolly as recited in claim 22, wherein the platform is disposed within the elongated frame and at least a portion of the platform is accessible from outside of the elongated frame, or the platform is disposed outside of the elongated frame.

26. The motorized dolly as recited in claim 22, further comprising one or more lasers attached to the elongated frame and aligned to project two or more laser beams that are spaced apart from one another at the elongated frame and converge approximately at the point in space.

27. The motorized dolly as recited in claim 22, wherein the one or more controls smoothly transition the motor from a clockwise rotation to a counter-clockwise rotation and vise versa.

28. The motorized dolly as recited in claim 22, wherein the first radius of the first arc-shaped rail and the second radius of the second arc-shaped rail are adjustable.

29. The motorized dolly as recited in claim 22, further comprising a housing attached to the elongated base and at least partially enclosing the first and second arc-shaped rails, the first and second pulleys, the continuous belt, the motor, the first and second set of rollers or wheels and the clamp.

30. The motorized dolly as recited in claim 22, wherein:
    the fastener comprises a clamp, a bolt, a clip, a pin, a rivet, a snap, a staple or a combination thereof;
    the continuous belt comprises a ribbed belt, a toothed belt, a V-belt, a multi-grooved belt, a cable or a chain;
    each rail has a circular, oval, elliptical, triangular, square, polygon, I or L-shaped cross-section;
    each set of rollers or wheels comprise two, three or four rollers or wheels; and
    each roller or wheel has a groove adapted to fit the first or second arc-shaped rails.

31. The motorized dolly as recited in claim 22, further comprising:
   a tilt head connected to the top surface of the platform and having one or more connectors to removeably and securely attach a device to the tilt head;
   a level indicator integrated into the tilt head; and
   the device comprises a camera, a light source, or a scientific instrument.

32. The motorized dolly as recited in claim 22, further comprising:
   one or more connectors attached to the platform to removeably and securely attach a device to the top surface of the platform;
   the device comprises a camera, a light source, or a scientific instrument;
   a monitor attached to the elongated base and communicably coupled to the device; and
   a communications interface connected to the one or more controls.

33. The motorized dolly as recited in claim 22, wherein the one or more controls comprise:
   a directional control connected to the motor;
   a speed control connected to the motor; or
   a multi-mode switch having an automatic operating mode and a manual operating mode.

34. The motorized dolly as recited in claim 22, further comprising:
   a fitting attached to a bottom surface of the elongated base to secure the motorized dolly to a tripod or stand;
   a level indicator attached to or integrated into the elongated base or the platform;
   a handle attached to the elongated base;
   a set of legs or rubberized feet attached to a bottom surface of the elongated base.

35. The motorized dolly as recited in claim 22, wherein the motor comprises a variable speed motor.

36. The motorized dolly as recited in claim 22, further comprising a power source connected to the motor, wherein the power source comprises an AC-to-DC adapter, one or more batteries, one or more photovoltaic cells or a combination thereof.

* * * * *